(No Model.)
F. M. TEEGUARDEN.
SAW TABLE GAGE.
No. 404,233. Patented May 28, 1889.
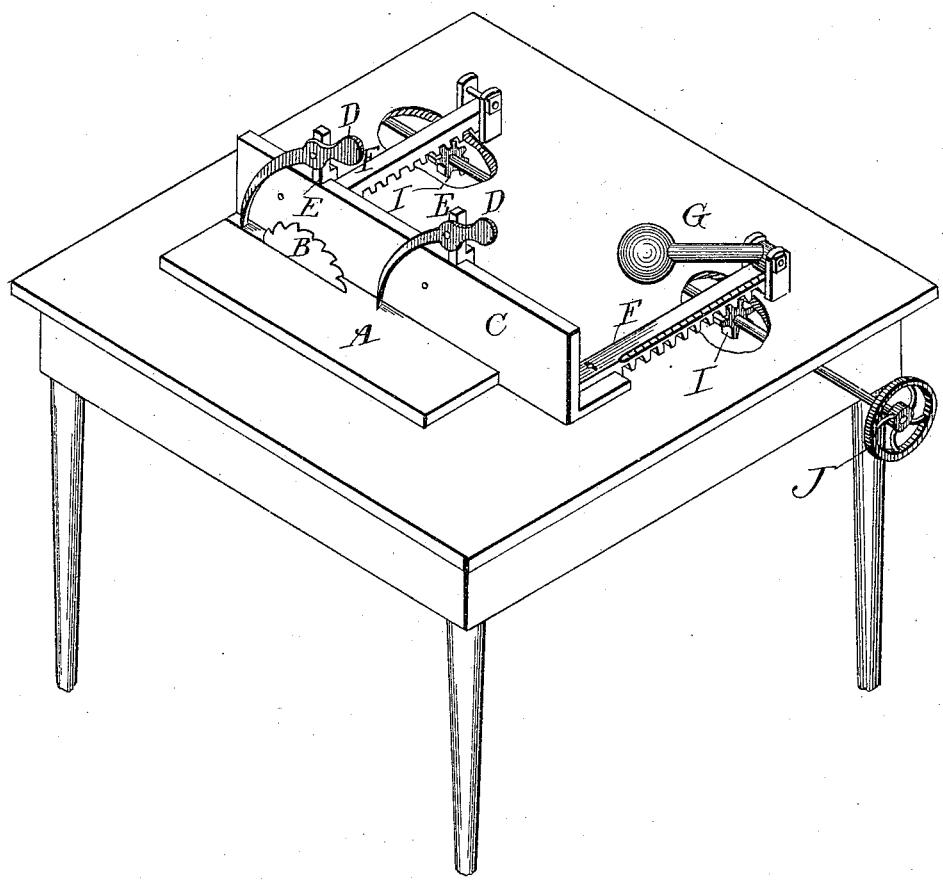
Witnesses.
George C. Harbaugh
Albert M. Gardner
Inventor
Freeman M. Teeguarden

UNITED STATES PATENT OFFICE.

FREEMAN M. TEEGUARDEN, OF COLFAX, INDIANA.

SAW-TABLE GAGE.

SPECIFICATION forming part of Letters Patent No. 404,233, dated May 28, 1889.

Application filed March 8, 1888. Serial No. 266,640. (No model.)

*To all whom it may concern:*

Be it known that I, FREEMAN M. TEEGUARDEN, a citizen of the United States, residing at Colfax, in the county of Clinton and State of Indiana, have invented a certain new and useful Improvement in Saw-Table Gages, to prevent accident from flying timber and for other purposes; and I do hereby declare the following to be a full, clear, and exact statement of the invention.

My invention relates, first, to the cutting of small pieces of timber with a circular saw, so arranged as to hold the block securely in position while the saw is passing through it, and to entirely prevent the saw from throwing the piece in any direction while cutting it, or after it has been cut; second, it is so constructed as to be readily and accurately changed to cut a piece of timber any desired width up to thirteen inches, and, third, to be easily and conveniently secured to any table where a circular saw is being used.

In the accompanying drawing a machine embodying my invention is shown in perspective.

The frame C is an angle with two faces, one resting flat on the table, to which are attached the draw-bars F F, cogged underneath, resting flat on the table and passing through the sockets H H, which holds the entire machine securely in place. The other face of the frame C stands at right angles from the one resting on the table, and facing the saw, to the upper edge of which are secured the uprights E E, on the top of which are fastened the dogs D D.

The cogs on the under side of the draw-bars F F engage in the cog-wheels I I, said wheels being secured on the shaft, at the end of which is the wheel J. The upper sides of the draw-bars F F are accurately marked to one-sixteenth inch to show the distance moved. Turning the wheel J changes the space between the frame C and the saw B, as desired, and admits of the board A being cut any width.

The device G is a clamp for holding the draw-bars F F at whatever point desired.

The dogs D D are curved, with their pointed end resting on the board A, and allowing it to pass under them freely from the hand of the operator, but in no case to fly back or in any other direction.

At the point where the draw-bars F F are secured to the frame C the holes are slotted and so arranged as to set the frame C at an angle to be applicable to cases where the saw has been dressed, so that it draws the wood to or presses it from it. The frame C may be readily shifted at an angle, and by this means prevent an immediate refiling of the saw.

I am aware that there are various plans for saw-table gages, some having one point similar to mine and others again having something else, and that patents therefor have been granted; but I am not aware that any where the combination and arrangement of the different parts have been used as I have put them together.

What I claim, and desire to secure by Letters Patent of the United States, is—

In a saw-table gage, the combination of the gage bar or frame C, the rack-bars F F, attached thereto, the pinions I I, engaging the teeth upon the rack-bars and fast upon a shaft journaled in the main frame and having an operating-wheel, J, on one end thereof, the clamps G, for locking the gage-bar in any adjusted position, the brackets E E on the gage-bar C, and the curved dogs D D, pivoted upon the face of the brackets, so that their lower ends shall rest upon the material as it is fed to the saw, substantially as described.

FREEMAN M. TEEGUARDEN.

Witnesses:
OWEN C. MCMINDER,
ABNER D. TROTTER.